April 23, 1929.    G. A. JOHNSON    1,710,313
COMBINED VENTILATING AND DRAINING UNION FOR
ELECTRIC CIRCUIT WIRE CONDUITS
Filed Jan. 9, 1926
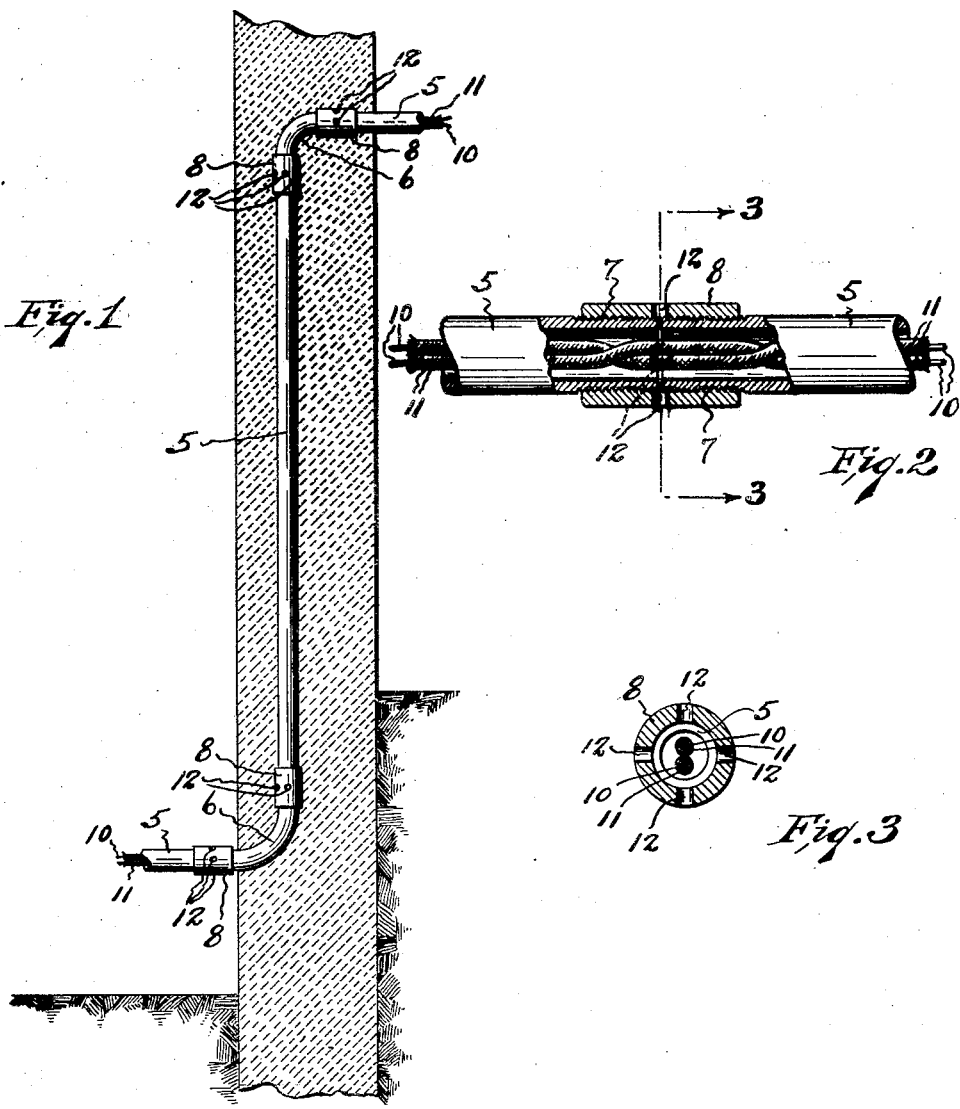
INVENTOR.
Gustave A. Johnson,
BY
Krautzef and Richards
ATTORNEYS.

Patented Apr. 23, 1929.

1,710,313

UNITED STATES PATENT OFFICE.

GUSTAVE A. JOHNSON, OF IRVINGTON, NEW JERSEY, ASSIGNOR TO AMERICAN METAL MOLDING CO., OF IRVINGTON, NEW JERSEY, A CORPORATION OF NEW JERSEY.

COMBINED VENTILATING AND DRAINING UNION FOR ELECTRIC-CIRCUIT-WIRE CONDUITS.

Application filed January 9, 1926. Serial No. 80,237.

This invention relates, generally, to a novel means for ventilating and draining tubular metallic conduits employed for housing electric circuit wires; and the invention has reference, more particularly, to a novel construction of union or coupling for use in combination with tubular metallic electric wire conduit, which by the construction thereof is adapted to both ventilate the latter and drain accumulations of moisture therefrom.

In metallic tubular pipe or conduit for electric circuit wires, which is commonly used to protect the latter in various forms and types of building structures, it has been found that variations of external and internal temperatures to which such pipe or conduit is subjected, both when exposed or when imbedded in concrete or other walls or bodies, gives rise to an accumulation of moisture within the pipe or conduit interior due to condensation. The presence of such accumulated moisture within the pipe or conduit produces detrimental effects upon the insulated electric circuit wires contained therein, often causing the rotting or disintegration of the insulation coverings of said wires whereby short circuits and other electrical disturbances result; and sometimes also causing corrosion or rusting of the interior sides of the pipe or conduit so that the insulation coverings of the wires adhere to the walls of the pipe or conduit, whereby such insulation is broken down and electrical grounding of the circuit wires follows; and, in fact, causing many other undesired conditions detrimental to the life and efficiency of the enclosed circuit wires.

It is the object of this invention to provide means in the form of a novel coupling or union by which desired sections of such metallic pipe or conduit may be joined together and which, by functioning to also ventilate and drain the interior of the pipe or conduit, will thereby eliminate the objectionable effects above referred to.

The invention is clearly illustrated in the accompanying drawings, in which:—

Figure 1 is a side elevation of metallic electric circuit wire conduit provided with the novel ventilating and draining couplings or unions made according to and embodying the principles of my present invention; Figure 2 is an enlarged fragmentary view of the same, with the novel ventilating and draining coupling or union shown in section; and Figure 3 is a cross-section, taken on line 3—3 in said Figure 2.

Similar characters of reference are employed in all of the hereinabove described views, to indicate corresponding parts.

Referring now to said drawings, the reference character 5 indicates lengths of metallic electric circuit wire conduit, and 6 interconnecting elbow sections for the same. These lengths and sections 5 and 6 of the conduit usually consist of metallic pipes or tubes made of iron or steel, and the ends of said lengths and sections 5 and 6 are usually externally threaded, as at 7, to receive internally threaded coupling or union members 8, by which said lengths and sections are joined together to provide a complete conduit of desired shape and extension. The conduit thus formed provides a longitudinally extended interior, forming a housing chamber 9 for enclosing the electric circuit wires 10. Said circuit wires 10 are provided with the usual insulation coverings 11.

The coupling or union member 8 is provided in its wall intermediate its ends with one or more openings or passages 12, which provide communication between the interior housing chamber 9 and the exterior of the conduit.

When said lengths and sections 5 and 6 are coupled together by the novel union members 8, to provide a conduit of desired shape and extension, and the wires 10 are housed therein, the openings or passages 12 of said union members will allow air to enter into the interior housing chamber 9 at such points when said union members are exposed to the atmosphere, and the circulation of air in and through the housing chamber 9 effects a ventilation of such interior of the conduit, which in itself is a factor tending to reduce condensation, and also tending to more nearly equalize the external and internal temperatures relative to the conduit. If, however, condensation of moisture should occur within the housing chamber 9, the liquid accumulation will tend to gravitate toward a union member 8, and entering the interior of the latter, will find one or more of the openings or passages 12 through which it can escape or drain away from the conduit interior. Even though the conduit should be imbedded in a concrete wall or other concrete mass, as is quite frequently the case in the use thereof in connection with various structures, the liquid accumulation will, upon exit from the openings or passages 12, be taken up by surrounding concrete mass, which, as is well known, is always more or less moisture absorptive.

From the above description it will therefore be understood, that my novel construction of ventilating and draining union or coupling for metallic electric circuit wire conduit, will offer very desirable functions tending to prevent the accumulatioan of condensed moisture within the interior of such conduit, and, consequently, the detrimental effects of such accumulations above referred to, will be substantially avoided both as to the conduit itself as well as to the insulated circuit wires housed and carried thereby.

Having thus described my invention, I claim:—

1. The combination with metallic electric circuit wire conduit made from a series of connected conduit members, of a union member intermediate said conduit members and coupling the same together with their adjoining ends spaced apart, said union member having in its walls and intermediate its ends radial passages disposed to communicate with the space intermediate adjoining conduit ends to provide communication between the interior and exterior of said conduit, serving both to ventilate said interior and drain accumulations of moisture therefrom.

2. The combination with metallic electric circuit wire conduit made from a series of connected pipe elements having externally threaded ends, of a union member having internally threaded ends to engage the externally threaded ends of adjoining pipe elements to couple the latter together with their adjoining ends spaced apart, said union member having in its walls and intermediate its ends radial passages disposed to communicate with the space intermediate adjoining conduit ends to provide communication between the interior and exterior of said conduit, serving both to ventilate said interior and drain accumulations of moisture therefrom.

In testimony, that I claim the invention set forth above I have hereunto set my hand this 29th day of December, 1925.

GUSTAVE A. JOHNSON.